Figure 1:
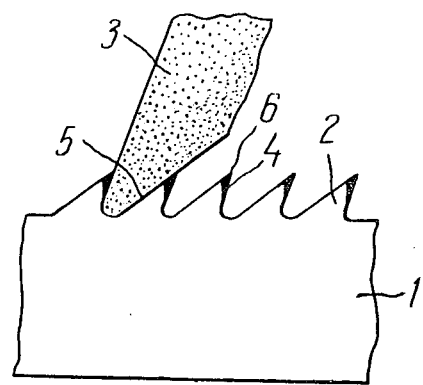

United States Patent
Idel

[11] 3,874,953
[45] Apr. 1, 1975

[54] METHOD OF HARDENING SAWS

[76] Inventor: Vladimir Viktorovich Idel, ulitsa Gersena, 3, kv. 37, Zavolzhie Gorkovskoi oblasti, U.S.S.R.

[22] Filed: Jan. 17, 1974

[21] Appl. No.: 434,222

Related U.S. Application Data

[63] Continuation of Ser. No. 300,361, Oct. 24, 1972, abandoned.

[30] Foreign Application Priority Data
Oct. 25, 1971 U.S.S.R. ............................ 1706661
Mar. 9, 1972 U.S.S.R. ............................ 1752608
Mar. 9, 1972 U.S.S.R. ............................ 1752609

[52] U.S. Cl. ............... 148/12.4, 148/144, 148/147, 148/152

[51] Int. Cl. ............................................. C21d 9/24
[58] Field of Search .......... 148/147, 144, 152, 12.4

[56] References Cited
UNITED STATES PATENTS
2,209,674  7/1940  Burish .............................. 148/147

*Primary Examiner*—W. Stallard
*Attorney, Agent, or Firm*—Holman & Stern

[57] ABSTRACT

A method in which an entire saw blade is hardened up to 52 Rockwell C and with the saw teeth being additionally hardened up to 65 Rockwell C by an abrasive disk during the sharpening thereof.

4 Claims, 2 Drawing Figures

METHOD OF HARDENING SAWS

This is a continuation, of application Ser. No. 300,361, filed Oct. 24, 1972 and now abandoned.

The present invention relates to method for hardening cutting saws.

More particularly and preferably the method to be carried out in accordance with the teachings of the present invention may be advantageously employed for hardening saws made of high carbon and alloyed steels.

A method for hardening saws having high-speed steels for saw teeth which are cut in the shape of a steel band or strip and having a hardness of up to 30 Rockwell C is known in the art. Here the entire saw blade is heated to a temperature of from 900° to 1,000°C in order to produce a hardness of 45 Rockwell C throughout the saw blade. Any additional hardening of the teeth is carried out at a temperature of 1,232°C immediately after the first hardening while the blade is still hot in order to bring about a hardness of up to 65 Rockwell C at the cutting edge. These hardening operations are effected in a furnace using frame or induction heating techniques (cf.GFR Pat. No. 1.086.259, cl. 18c).

The afore-mentioned prior art method has the disadvantage of having to use additional equipment such as furnaces. Besides, from a technological point of view it is difficult to effect the heating of the tooth front face so as to ensure an increase in its hardness which is much desirable for facilitating the chip work-off during operation of the saw.

The object of the present invention is to simplify the saw hardening techniques.

Another object of the invention is to provide a method for hardening saws by which the cutting edges and front faces thereof can be given maximum hardness.

In accordance with these and other objects and purposes of the invention a method is provided for hardening saws which comprises a step of preliminary hardening the entire saw blade up to a 52 Rockwell C and a subsequent additional hardening of saw teeth to a 65 Rockwell C wherein, according to the invention, the additional hardening is effected during the sharpening of the said saw teeth by an abrasive disk, said abrasive disk heating either the front face or the back edge of the tooth to a temperature which is close to the melting temperature of the saw material, and then drastically cooling or quenching them to the tempering temperature by an air stream resulting from the rotation of said abrasive disk, and said either front face or back edge of the cutting edges of a tooth being subjected to slow cooling to the ambient temperature thereof.

In cases where there is a slight or negligible difference in the length between the front face and the back edge of a tooth, an additional hardening effected during sharpening is envisaged for the front face.

When the back edge of a tooth is much longer than its front face, an additional hardening carried out during, the sharpening, thereof is equally preferable for the back edge.

It is quite expedient to harden the back edge for one quarter to one half its length measuring from the tooth tip.

Such a hardening of the back edge permits the heating of the saw tooth to a small depth, and thus a hardened layer can be produced only at the tooth tip area.

The method of hardening saws according to the present invention excludes the use of heating equipment such as hardening furnaces and cooling or quenching mathos for the additional hardening and ensures the attainment of a high hardness for the cutting edges and the tooth tips.

Moreove, the method according to the invention is suitable for carrying out repeated additional hardenings of the teeth during their resharpening.

Saws hardened by the method disclosed herein are characterized by longer teeth life before resharpening is necessary and an overall longer service life.

Figure 2:
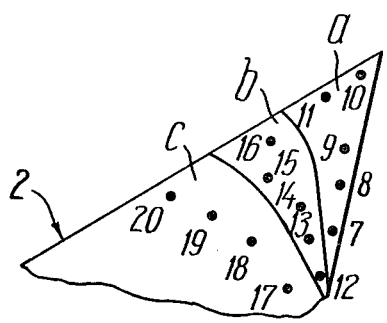

A particular embodiment of the present invention will now be described with due reference to the accompanying drawings wherein:

FIG. 1 shows a fragment of a band saw blade processed by the inventive method; and FIG. 2 shows an enlarged view of the saw tooth tip processed by the inventive method.

Now referring to FIG. 1, a band saw blade 1 made of a high carbon steel and preliminary hardened to the value of 40 to 50 Rockwell C proceeds to the mechanical processing and for sharpening of the teeth 2. That teeth 2 are sharpened by an abrasive disk 3 on a tool —grinding machine (not shown).

While being sharpened the teeth 2 are additionally hardened.

When front face 4 and back edge 5 have a slight or negligible difference in length, the additional hardening of teeth consists of hardening the cutting edges 6 and front faces 4 by means of an abrasive disk 3. The abrasive disk creates a pressure at front face 4 so that the resulting temperature at this front face is close to the melting temperature of the material of saw 1 which in the example described hereinbelow is a carbon steel having a carbon content of 0.8 percent. The high temperature in the cutting zone at the cutting edges 6 and front face 4 may be obtained by imparting a circumferential speed of about 35 meters per second to the abrasive disk and removing a much larger portion of metal from front face 4 in comparison with that removed from the back edge 5.

Preferably, the abrasive disk may be made of a white electrolytically produced or synthetic, ceramic—bound corundum with an improved hardness characteristic.

The drain size of this disk should be from 16 to 25 microns.

The heating time of the front face 4 to the temperature close to the melting temperature of the steel ranges from 0.02 to 0.2 second. During this period of time the tooth 2 is heated to the depth of 1 to 3 millimeters. The required heating time is determined by the above-mentioned parameters such as the abrasive disk speed, the abrasive disk structure, and the amount of metal removal, etc.

The drastic cooling or quenching of front face 4 and cutting edges 6 to the tempering temperature of from 200° to 400°C requires from 0.1 to 1 second. The quenching is effected in an air stream resulting from rotation of the abrasive disk. The quenching time is the sum of the time of lifting the abrasive disk 3 from the front face 4 plus the time for moving the step feed of the saw 1 by one or more teeth 2.

Further cooling of the saw 1 and the hardened tooth 2 is continued away from the disk 3 in a calm air atmosphere to the ambient temperature for several minutes.

As a result of such additional hardening of the teeth 2 of the saw 1 cutting edges 6 of the tooth 2 are hardened to a depth of tenth fractions of a millimeter and its front face 4 is hardened to a depth of hundredth fractions of a millimeter.

FIG. 2 shows the microstructure of a tooth of the saw made of a steel having a carbon content of 0.8. The area $a$ at the tip of the tooth 2 is a hardened layer possessing a high hardness (amounting to 60 Rockwell C) and having a martensitic-austenitic structure or matrix.

Area $b$ behind the hardened layer or area $a$ has the structure or matrix of a highly tempered martensite or troostite having a reduced hardness as low as 38 Rockwell C.

The area $c$ running after area $b$ into the saw blade has an initial hardness of 44 to 52 Rockwell C.

Points 7, 8, 9, 10, 11, 12, 13, 14, 15, 16, 17, 18, 19, 20 represent microhardness tests made at the tip of tooth 2. The results of the tests are summarized in the table given below.

Table 1

| Test No. | 7 | 8 | 9 | 10 | 11 | 12 | 13 | 14 | 15 | 16 | 17 | 18 | 19 | 20 |
|---|---|---|---|---|---|---|---|---|---|---|---|---|---|---|
| Micro-hardness RC | 56 | 58 | 59 | 59 | 58 | 38 | 40 | 39 | 40 | 38 | 44 | 45 | 44 | 46 |

The tooth cutting edges have a hardness of up to 70 Rockwell C.

When the saw teeth have front faces which are much shorter than the back edges, e.g., they are about 2 to 4 times shorter, an additional hardening is applied to the back edge. The optimum length for hardening of the back edge is from ¼ to ½ of the total back edge length measuring from the tooth tip. The additional hardening of the back edges is carried out similarly to the above-disclosed additional hardening of tooth front faces.

We claim:

1. A method of hardening saws comprising the steps of: hardening of an entire saw blade to a 52 Rockwell C; additionally hardening the saw teeth to 65 Rockwell C effected during the sharpening of said saw teeth by an abrasive disk, said abrasive disk heating either a front face or a back edge and the cutting edges of each tooth to the temperature which is close to the melting temperature of the saw material, and then quenching to the tempering temperature by an air stream resulting from the rotation of said abrasive disk; and allowing a subsequent slow cooling of said either front face or back edge and said cutting edges to the ambient temperature.

2. A method as claimed in claim 1 wherein in the case where there is a slight or negligible difference in length between said front face and said back edge of said teeth the front face is additionally hardened during said sharpening.

3. A method as claimed in claim 1 wherein in the case where said back edge is considerably longer than said front face of said teeth, the back edge is additionally hardened during said sharpening.

4. A method as claimed in claim 3, wherein said back edge is hardened for ¼ to ½ of its length measuring from the tooth tip.

* * * * *